April 8, 1930.                C. G. KING                 1,753,570
                                PIN
                  Filed Oct. 22, 1929      5 Sheets-Sheet 1
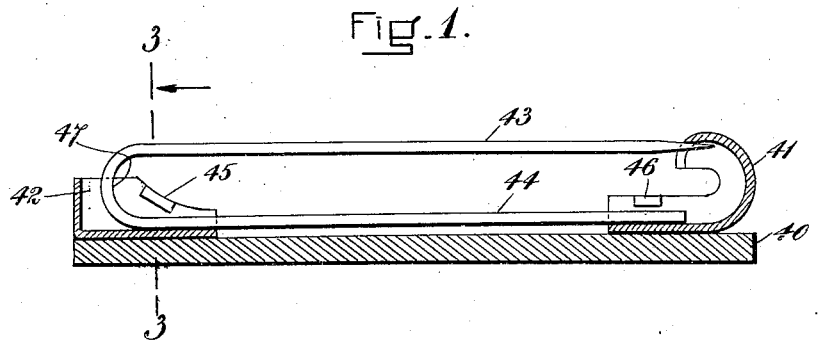
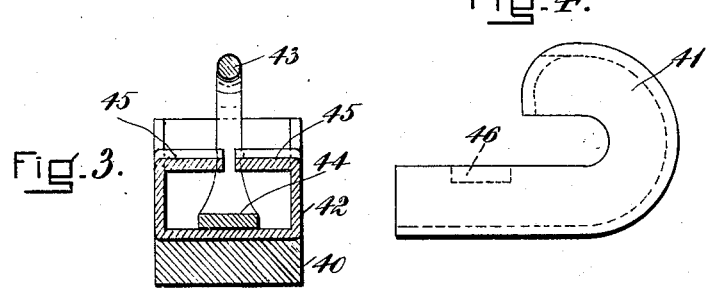
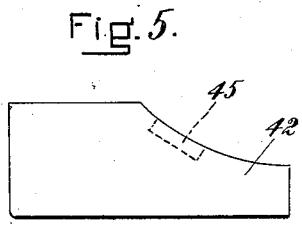
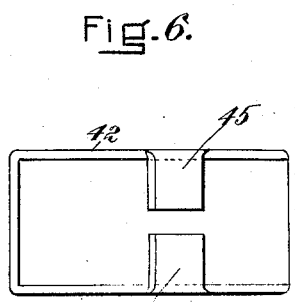
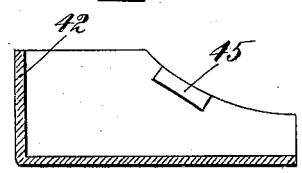
INVENTOR:
Clifford G. King
By Geo. L. Woodworth
ATTORNEY April 8, 1930.                  C. G. KING                  1,753,570
                                   PIN
                   Filed Oct. 22, 1929        5 Sheets-Sheet 2

INVENTOR:
Clifford G. King
Geo. R. Woodworth
ATTORNEY:

April 8, 1930.  C. G. KING  1,753,570
PIN
Filed Oct. 22, 1929  5 Sheets-Sheet 3
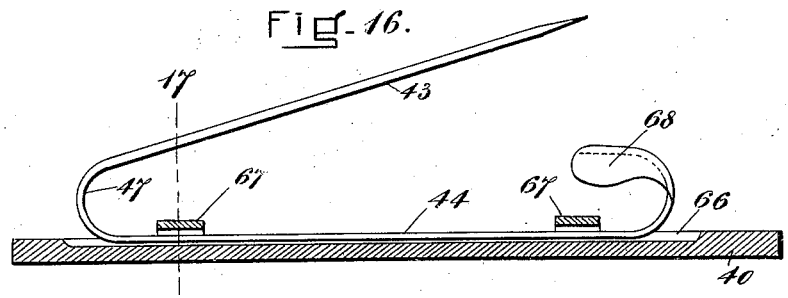
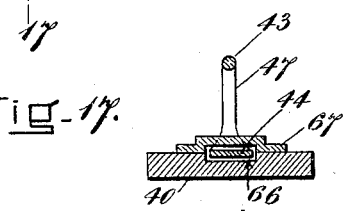
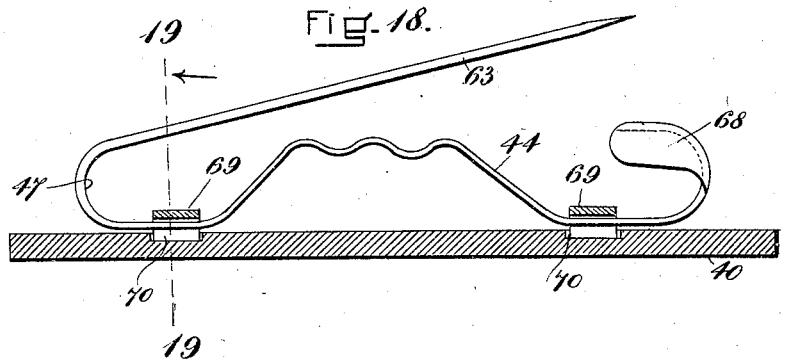
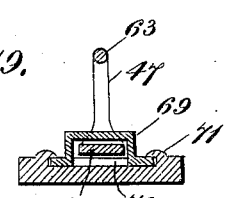
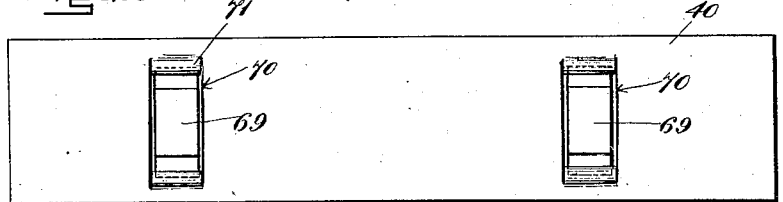
INVENTOR:
Clifford G. King
BY Geo. K. Woodworth
ATTORNEYS April 8, 1930.   C. G. KING   1,753,570
PIN
Filed Oct. 22, 1929    5 Sheets-Sheet 4
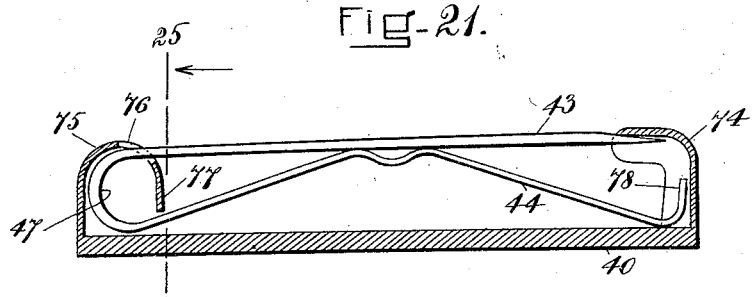
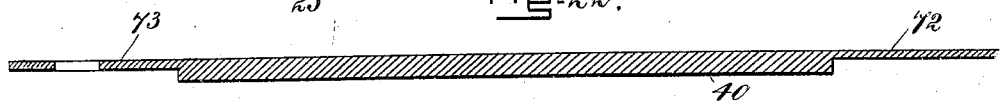
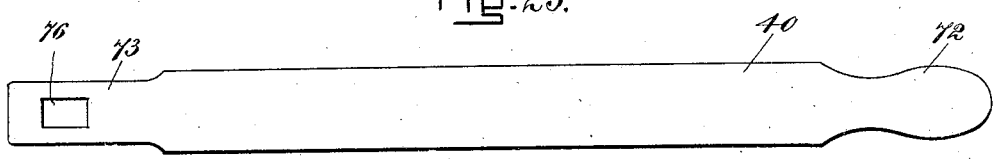
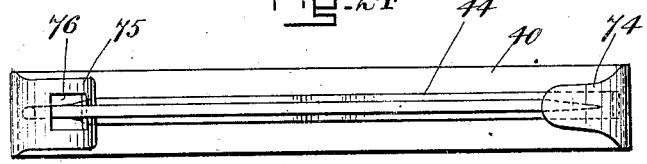
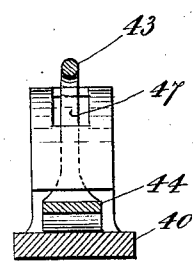
INVENTOR:
Clifford G. King
BY Geo. K. Woodworth
ATTORNEY:

April 8, 1930.                     C. G. KING                       1,753,570
                                      PIN
                             Filed Oct. 22, 1929         5 Sheets-Sheet 5
Fig-26.
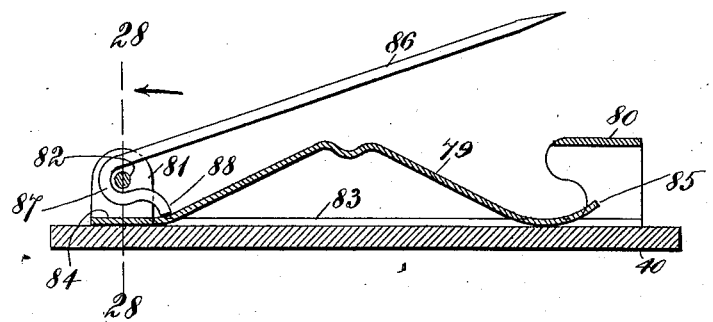
Fig-27.
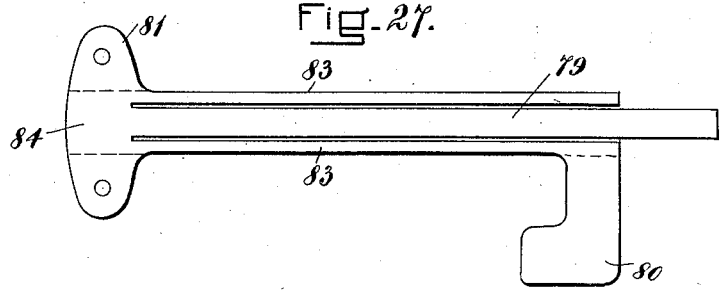
Fig-28.
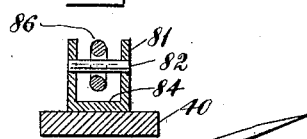
Fig-29.
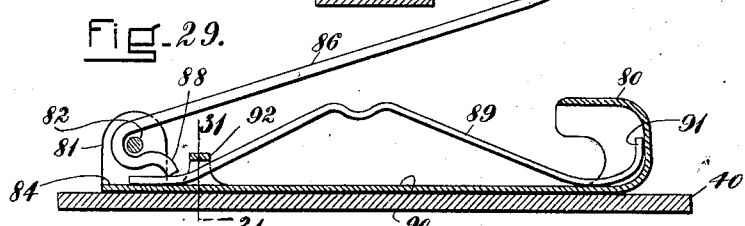
Fig-30.
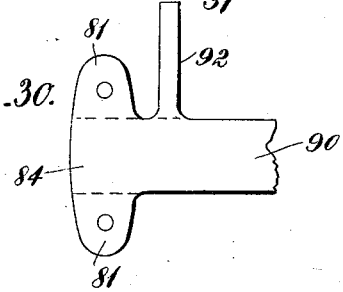
Fig-31.
INVENTOR:
Clifford G. King
BY Geo. K. Woodworth
ATTORNEY:

Patented Apr. 8, 1930

1,753,570

UNITED STATES PATENT OFFICE

CLIFFORD G. KING, OF PROVIDENCE, RHODE ISLAND

PIN

Application filed October 22, 1929. Serial No. 401,567.

This invention relates to pins, brooches and the like and more especially to such articles having enamelled front plates. Considerable loss is caused by the usual method of assembling an enamelled pin which consists in soldering the pin joints and catches and then after enamelling, fastening the pin-tongues into their housings, because this procedure usually results in cracking the enamel on the thin front plate. By means of the constructions hereinafter described, I overcome this difficulty by using a relatively thick enamelled front plate and flexibly securing the pin-tongue thereto without subjecting the front plate to the strain that would crack the enamel; and by discarding the shell front plate type of construction for enamelled pins which results in considerable breakage of the enamelled surface when the pin-tongue is assembled with said front plate.

In the drawings which accompany and form a part of this specification—

Figure 1 is a central longitudinal section of a two-piece pin embodying my invention;

Fig. 2 is a plan view;

Fig. 3 is a transverse section on an enlarged scale taken on the line 3—3 of Fig. 1;

Fig. 4 is a side view on an enlarged scale of the pin-point-retaining catch shown in Fig. 1;

Fig. 5 is a side view on an enlarged scale of the pin-tongue housing shown in Fig. 1;

Fig. 6 is a plan view of said housing; and

Fig. 7 is a central longitudinal section thereof;

Figure 8:
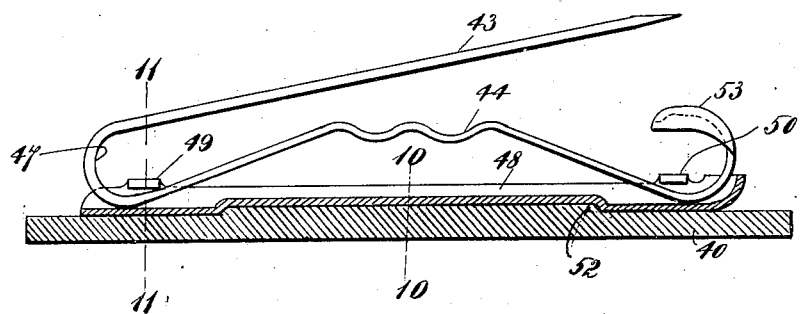
Fig. 8 is a central longitudinal section of a modification.
Figure 9:
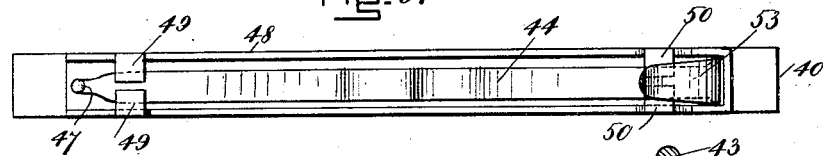
Fig. 9 is a plan view of said modification.
Figure 10:
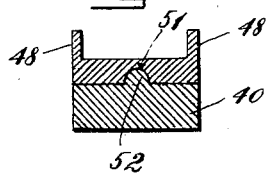
Figure 11:
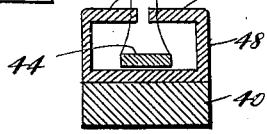
Figure 12:
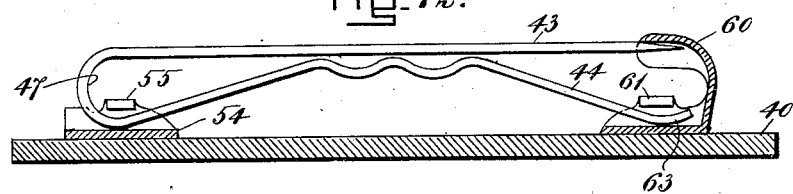
Figure 13:
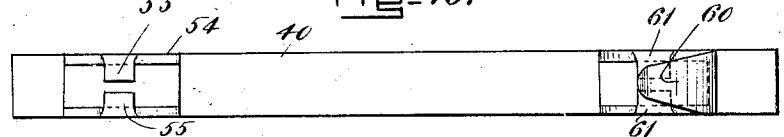
Figure 14:
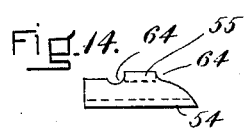
Figure 15:
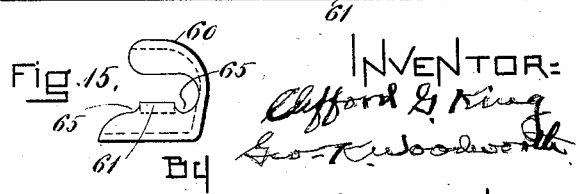

Figs. 10 and 11 are transverse sections taken on the lines 10—10 and 11—11 of Fig. 8;

Fig. 12 is a central longitudinal section of a further modification;

Fig. 13 is a plan view of the pin shown in Fig. 12;

Fig. 14 is a side view of the pin-tongue housing shown in Fig. 12;

Fig. 15 is a side view of the pin catch shown in Fig. 12;

Fig. 16 is a central longitudinal section of another modification;

Fig. 17 is a section taken on the line 17—17 of Fig. 16;

Fig. 18 is a central longitudinal section of a modified form of the pin shown in Fig. 16;

Fig. 19 is a transverse section taken on the line 19—19 of Fig. 18;

Fig. 20 is a plan view of the pin shown in Fig. 18;

Fig. 21 is a central longitudinal section of a two-piece pin embodying my invention;

Fig. 22 is a central longitudinal section of the blank used for making the pin shown in Fig. 21;

Fig. 23 is a plan view of said blank;

Fig. 24 is a plan view of the completed pin;

Fig. 25 is a transverse section on the line 25—25;

Fig. 26 is a central longitudinal section of another type of pin employing a pintle;

Fig. 27 is a plan view of the blank used for making the pin shown in Fig. 26;

Fig. 28 is a section taken on the line 28—28 of Fig. 26;

Fig. 29 is a central longitudinal section of a modification of the pin shown in Fig. 26;

Fig. 30 is a fragmentary plan view of the blank used for making the pin shown in Fig. 29;

Fig. 31 is a transverse section taken on the line 31—31 of Fig. 29.

In the particular drawings selected for more fully disclosing my invention, 40 is the relatively thick front plate of an enamelled pin to the respective ends of which are secured by soft soldering the pin-point catch 41, and the pin-tongue housing 42. The pin-tongue which consists of spring material bent upon itself and comprising the upper arm 43 and the lower arm 44 is held in place by two pairs of inwardly-extending lugs 45, 46 formed respectively on the side walls of the housing and catch. The pin-tongue is placed in position and the lugs 45, 46 are then bent over. The bent portion 47 of the pin-tongue is thus flexibly secured to the front plate, and the free end of the lower arm 47 is also flexibly secured thereto, having slight longitudinal movement as the pin is opened and closed. As indicated, the lower arm 44 preferably is flattened. It has been found that a pin of this type can be assembled without cracking the enamel.

Fig. 8 shows a three-piece pin comprising the back plate 48 formed channel-shaped by feeding a flat strip through an automatic machine, and provided with inwardly-extending lugs 49, 50 and trimmed to shape either by said machine, or afterward by a draw-tool, or by a press. The under side of said back plate is provided with a longitudinal groove 51 arranged to receive a correspondingly shaped projection 52 formed in the upper face of the relatively thick front plate 40 for positioning the two plates and preventing relative movement during the soldering operation which, as is well understood, consists in passing a number of the pins through a heated oven on pieces of charcoal. It has been demonstrated in practice that the considerable loss caused by the movement of the back plate with respect to the front plate during the soldering operation is effectively prevented by this construction. The pin-tongue is of the same type as already described in connection with Fig. 1, and my prior patents, for instance, Letters Patent No. 1,589,705, of June 22, 1926, except that the lower arm 44' has the pin-point catch 53 formed integral therewith. In this case the pin-tongue is flexibly secured to the back plate at the bent portion and the free end thereof. It will be obvious of course that the plate 47 may be employed as a front plate in a two-piece pin by omitting the groove 51 and ornamenting the outer surface thereof.

In Fig. 12 I show a two-piece pin in which the housing 54, provided with the inwardly-extending lugs 55, is secured to the enamelled front plate 40 by soft soldering, or any other suitable method that will not fracture the enamel. The pin catch 60 having the inwardly-extending lugs 61 is similarly attached to the opposite end of the front plate, and the pin-tongue is then placed in position after which the lugs 55, 61 are bent down to hold the same. The lower arm of the pin-tongue preferably is flattened and the free end 63 thereof, as well as the bent portion 47, is flexibly secured to the front plate.

In this instance, the walls of the housing and the catch member may be grooved, as shown at 64, 65 to form the lugs 55, 61, respectively.

In Fig. 16 the front plate, relatively thick and enamelled, as in the other embodiments of my invention, is grooved longitudinally, as shown at 66, for receiving the flattened lower arm 44 of the pin-tongue which is flexibly secured thereto in the present instance by the saddles 67, 67 which are soldered, or otherwise suitably attached to the front plate. In the present instance, the lower arm 44 terminates in a pin-catch 68.

It will be obvious of course that the two saddles or retaining plates 67, 67 may be united into a single member.

In Fig. 18 the longitudinal groove 66 has been omitted and the lower arm of the pin-tongue is bowed upwardly to form a spring bridge, the function of which has been described in my prior patents, for example, Letters Patent No. 1,221,869, Apr. 10, 1917, and saddles 69, 69 slightly different in shape from those shown in Fig. 16, are employed to flexibly secure the pin-tongue to the front plate.

As indicated in Fig. 19, the front plate is provided with transversely-extending grooves 70, 70 near the ends thereof, into which grooves the said saddles are fitted after the pin-tongue has been placed in position, and are then secured to the front plate by turning the ridges 71 over the flanges of said saddles. The said ridges are produced at the time the front plate is ornamented by embossing, and are made by corresponding forms constituting a part of the forcer whereby the outer surface of the front plate is struck into the disc.

It will be noted that the ridges or raised portions 71 are swaged over the flanges of the saddle 79 by a process similar to that whereby the headings that project over the edges of a setting for a precious stone, are bent over against the facets of such stone to hold the same in position.

An extremely simple and economic construction is shown in Figs. 21 to 25, inclusive, wherein the sprews 72, 73, or the metal flattened out during the process of embossing the front plate 40 are utilized for the catch 74 and housing 75 for the bent portion of the pin-tongue, metal being added to the sprews when necessary, and the same being shaped by a die, as indicated in Fig. 23. The flattened end 73 is provided with an aperture 76 through which the pointed upper arm 43 of the pin-tongue is inserted after the flattened portion 73 has been bent upwardly, and then the end 77 thereof is bent downwardly, as shown in Fig. 21, to complete the housing. In this instance, the free end 78 of the lower arm may be bent upwardly into the catch 74 which holds the same in position, but does not clamp it so tightly as to prevent the free relative movement of said arm with respect to the front plate.

In Figs. 26 to 31, inclusive, are shown two types of hinged pins in which the relatively thick enamelled front plate 40 is employed. In Fig. 26, the bridge 79 is formed integral with the catch 80 and the ears 81 in which is mounted the pintle 82. A suitable blank for this construction is represented in Fig. 27 in which the several parts are numbered correspondingly to Fig. 26. The outer edges 83, 83 of the blank shown in Fig. 27 and the head portion 84 thereof, are soft-soldered, swaged or otherwise suitably secured to the front plate to form a back plate after the ears and catch have been bent up along the dotted lines indicated in Fig. 27. The free end 85 of the spring bridge is flexibly secured to the front plate by the walls of the catch 80 so that as the pin is closed and the fabric engaged between the same and the bridge, the said end of the latter is free to move with respect to the front plate. The pin 86 is provided with a bend 87 which takes around the pintle 82 and terminates in a projecting end 88 which, engaging the spring bridge, constitutes a stop for the pointed end of the pin-tongue.

A modified form of pin illustrated in Fig. 26 is shown in Figs. 29 to 31 wherein the spring bridge 89 flexibly secured to the back plate 90 is not integral with said backplate and is held in position by the catch 80 which encloses the free end 91 thereof and by the lug 92 which is formed integral with the back plate, as indicated in Fig. 30, and is bent upwardly, over and then downwardly to enclose the end of the spring bridge, as indicated in Fig. 31. In this case also, the pin-tongue is provided with a stop 88 and the spring bridge is relatively movable with and is flexibly secured to the back plate.

It will be readily understood, without further multiplication of drawings, that various details of construction shown in certain figures may be used in connection with the constructions illustrated in various other figures, and that various modifications may be made by those skilled in the art without departing from the invention as defined by the appended claims.

Having thus described illustrative embodiments of my invention without however limiting the same thereto, what I claim and desire to secure by Letters Patent is:—

1. A pin having a relatively thick enamelled front plate, a pin-tongue of spring material bent upon itself and comprising an upper and a lower arm, a housing for the bent portion of said pin-tongue, a catch for the pointed end of said pin-tongue, and means for flexibly securing the bent portion of said pin-tongue to said front plate, the free end of said lower arm being flexibly secured to said front plate.

2. A pin having a relatively thick enamelled front plate, and a relatively thin back plate, said back plate being provided with a longitudinal groove and said front plate with a longitudinal projection co-operating with said groove, a pin-tongue and means for flexibly connecting said pin-tongue to said backplate.

3. A pin having a front plate, a pin-tongue formed of spring material bent upon itself and comprising an upper and a lower arm, the free end of said lower arm having a pinpoint catch formed integral therewith, and means for flexibly securing the bent portion of said pin-tongue to said front plate, the free end of said lower arm being flexibly secured to said front plate.

4. A pin having a relatively thick enamelled front plate, a pin-tongue of spring material bent upon itself and comprising an upper and a lower arm, said lower arm being upwardly bowed to form a spring bridge co-operating with said upper arm when the pin is closed, and means for flexibly securing said spring bridge to said front plate.

5. A pin having a relatively thick enamelled front plate, a pin-tongue having an upper and a lower arm, and means for flexibly securing said pin-tongue to said front plate, the free end of said lower arm being flexibly secured to said front plate and having slight longitudinal movement as the pin is opened and closed.

6. A pin having a relatively thick enamelled front plate, a pin-tongue having an upper and a lower arm, and means for flexibly securing said pin-tongue to said front plate, the free end of said lower arm being flexibly secured to said front plate and having slight longitudinal movement as the pin is opened and closed, said means comprising a member secured to said front plate and extending transversely thereof above said lower arm.

In testimony whereof, I have hereunto subscribed my name this 19th day of October, 1929.

CLIFFORD G. KING.